US009372995B2

(12) United States Patent
Shigemoto et al.

(10) Patent No.: US 9,372,995 B2
(45) Date of Patent: Jun. 21, 2016

(54) VULNERABILITY COUNTERMEASURE DEVICE AND VULNERABILITY COUNTERMEASURE METHOD

(75) Inventors: Tomohiro Shigemoto, Tokyo (JP); Hirofumi Nakakoji, Tokyo (JP); Tetsuro Kito, Tokyo (JP); Hisashi Umeki, Tokyo (JP); Satoshi Takemoto, Tokyo (JP); Tadashi Kaji, Tokyo (JE); Satoshi Kai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 149 days.

(21) Appl. No.: 14/237,152

(22) PCT Filed: Sep. 8, 2011

(86) PCT No.: PCT/JP2011/070483
§ 371 (c)(1),
(2), (4) Date: Jul. 18, 2014

(87) PCT Pub. No.: WO2013/035181
PCT Pub. Date: Mar. 14, 2013

(65) Prior Publication Data
US 2014/0373160 A1    Dec. 18, 2014

(51) Int. Cl.
*G06F 21/00* (2013.01)
*G06F 21/57* (2013.01)
(52) U.S. Cl.
CPC ........ *G06F 21/577* (2013.01); *G06F 2221/033* (2013.01)
(58) Field of Classification Search
CPC ............ H04L 63/1416; H04L 63/1433; H04L 63/1425
See application file for complete search history.

(56) References Cited

U.S. PATENT DOCUMENTS

| 7,181,769 B1* | 2/2007 | Keanini | H04L 63/1416 713/166 |
| 2005/0188215 A1* | 8/2005 | Shulman | H04L 63/1416 713/188 |
| 2006/0195588 A1* | 8/2006 | Pennington | G06F 21/53 709/227 |

FOREIGN PATENT DOCUMENTS

| JP | 2002-318707 A | 10/2002 |
| JP | 2006-040196 A | 2/2006 |
| JP | 2006-146297 A | 6/2006 |
| JP | 2010-067216 A | 3/2010 |

* cited by examiner

*Primary Examiner* — Brandon Hoffman
*Assistant Examiner* — Helai Salehi
(74) *Attorney, Agent, or Firm* — Volpe and Koenig, P.C.

(57) ABSTRACT

A vulnerability countermeasure device stores configuration information associating multiple computers connected via a network and software possessed by each computer, vulnerability information associating the software with information related to the vulnerability of the software, and countermeasure policy information associating the software with a countermeasure policy to be executed if there is a vulnerability in the software; calculates the computer that data will reach based on information related to a route of the data included in the data received from a used terminal; acquires software existing in the computer based on the calculated computer and configuration information; assesses whether or not there is a vulnerability in the acquired software based on the acquired software and the vulnerability information; and is provided with countermeasure unit for executing a countermeasure to a vulnerability in accordance with a countermeasure policy with respect to the software assessed to have the vulnerability.

18 Claims, 12 Drawing Sheets

| 301 | 302 | 303 | 304 | 305 |
|---|---|---|---|---|
| ROUTE ID | HOST | PATH | PARAMETER | ROUTE |
| 1 | www.serverA.org | serverA.cgi | id | SERVER A |
| 2 | www.serverA.org | serverA.cgi | cmd | SERVER A, SERVER B |
| 3 | www.serverA.org | serverA.cgi | c | SERVER A, SERVER B, SERVER C |
| 4 | www.serverA.org | serverA1.cgi | - | SERVER A |
| | | | | |

| 401 | 402 | 403 | 404 |
|---|---|---|---|
| CONFIGURATION ID | COMPUTER IDENTIFIER | SOFTWARE | VERSION |
| 1 | SERVER A | WEB SERVER PROGRAM | 0.9 |
| 2 | SERVER A | OPERATING SYSTEM A | 2.3 |
| 3 | SERVER B | DB SERVER PROGRAM | 2.3 |
| 4 | SERVER B | OPERATING SYSTEM B | 0.5 |
| 5 | SERVER C | IMAGE PROCESSING PROGRAM | 1.5 |
| 6 | SERVER C | OPERATING SYSTEM C | 2.2 |

| COMPUTER IDENTIFIER | SOFTWARE | VULNERABILITY ID | COUNTERMEASURE ID |
|---|---|---|---|
| SERVER A | WEB SERVER PROGRAM | 1 | 1.2 |
| SERVER C | IMAGE PROCESSING PROGRAM | 3 | 4 |

| HOST | PATH | COMPUTER IDENTIFIER | DATA AMOUNT |
|---|---|---|---|
| www.serverA.org | serverA.cgi | SERVER A | 300 |
| www.serverA.org | serverA.cgi | SERVER B | 200 |
| www.serverA.org | serverA.cgi | SERVER C | 100 |

1101  1102  1103  1104

VULNERABILITY COUNTERMEASURE DEVICE AND VULNERABILITY COUNTERMEASURE METHOD

TECHNICAL FIELD

The present invention relates to techniques for taking countermeasures against the effects of vulnerability of the software possessed by computers existing on data reaching routes.

BACKGROUND ART

In recent years, diverse systems have been configured to offer services via intranets and on the Internet. These systems are each equipped with multiple computers and multiple pieces of networking equipment. On each computer, multiple pieces of software (service programs, client programs, operating systems, etc.) all operate in cooperation with one another.

In order to let these systems operate securely, it is important to take countermeasures against the vulnerability of the software running on the systems. Taking countermeasures against such vulnerability requires system administrators to apply correction patches thereto as needed. However, as systems have grown massive in size, the system administrators have been overwhelmed with workload; they even find it difficult to know which piece of software is vulnerable on which computer.

Thus there has been a need for vulnerability countermeasure techniques that will take the place of the system administrators in countering the vulnerability of the computers configured in a given system. For example, U.S. Pat. No. 7,181,769 (Patent Literature 1) proposes a system that checks hosts on a management target network for vulnerability and collects signatures of host-resident vulnerability on a server for signature surveillance.

Japanese Unexamined Patent Publication No. 2006-146297 (Patent Literature 2) proposes a server which manages applied states of the software and patches installed in each client and which, based on the latest security information acquired via a network, performs control to open and close the TCP/IP ports of the routers to which the clients are connected for security management purposes.

SUMMARY OF INVENTION

The invention of the above-cited Patent Literature 1 is considered effective in managing signatures of the vulnerability that exists in the hosts and taking countermeasures against such vulnerability. However, taking countermeasures using signatures presents the problem of interrupting more data than is necessary because of a halfway disconnection of communication or inordinately consuming server resources due to the effects of a connection that is not terminated normally.

The invention of the above-cited Patent Literature 2 can counter, to some extent, the effects of clients' communications by closing the TCP/IP port that could be a route assessed to be vulnerable to viruses and illegal access following analysis of the content of patched information pages. However, closing the port poses the problem of interrupting other kinds of access in addition to viruses and unlawful access attempts.

The present invention has been made in view of the above circumstances and provides a vulnerability countermeasure device and a vulnerability countermeasure method capable of assessing the effects of vulnerability in order to prevent data from being interrupted more than is necessary.

In addressing the foregoing and other problems of the related art and according to one embodiment of the present invention, there is provided a vulnerability countermeasure device for taking countermeasures against the vulnerability of a system configured of multiple computers connected via a network, the vulnerability countermeasure device including: a storage unit which stores configuration information associating each of the computers with a piece of software possessed thereby, vulnerability information associating the software with information related to the vulnerability of the software, and countermeasure policy information associating the software with a countermeasure policy to be executed if there is a vulnerability in the software; an assessment unit which receives data transmitted by a used terminal on the system, calculates the computer that the data will reach on the basis of information related to a route of the data included in the received data, acquires the software residing in the computer based on the calculated computer and on the configuration information, and assesses whether there is a vulnerability in the acquired software, and a countermeasure unit which, if the assessment unit assesses that there is a vulnerability in the software, executes countermeasures on the software assessed to be vulnerable against the vulnerability in accordance with the countermeasure policy stored in the countermeasure policy information.

Preferably, the assessment unit may calculate the computer that the data will reach with regard to each of the parameters providing operating conditions for services offered by the software included in the data.

Preferably, the assessment unit may acquire the software residing in each of the computers.

Preferably, the assessment unit may assess whether there is a vulnerability in each piece of the software.

Preferably, the countermeasure unit may execute the countermeasure designated in the countermeasure policy for each of the parameters providing operating conditions for services offered by the software included in the data.

Preferably, the countermeasure unit may execute the countermeasure designated in the countermeasure policy for each of the computers and for each piece of the software.

Preferably, the assessment unit may further include a holding unit which, upon assessing that there is a vulnerability in the software of the computer, holds the computer, the software, the vulnerability information, and results of the countermeasures taken against the vulnerability. The vulnerability countermeasure device may further include a visualization unit which visualizes the computer, the software, the vulnerability information, and the results of the countermeasures taken against the vulnerability, all held in the assessment unit.

Preferably, the visualization unit may output simultaneously the computer that the data will reach and the vulnerability information residing in the computer.

Preferably, the visualization unit may output simultaneously the computer that the data will reach and the results of the countermeasures executed by the computer.

Preferably, the visualization unit may output simultaneously the computer that the data will reach and the amount of the data arriving at the computer.

According to another embodiment of the present invention, there is provided a vulnerability countermeasure method for use with the above-outlined vulnerability countermeasure device.

The present invention provides the advantageous effect of preventing data from being interrupted more than is necessary.

BRIEF DESCRIPTION OF DRAWINGS

Further objects and advantages of the present invention will become apparent upon a reading of the following description and appended drawings in which:

FIG. 3 is a tabular view listing typical route information data;

FIG. 4 is a tabular view listing typical configuration information data;

FIG. 10 is a tabular view listing a typical vulnerability countermeasure log of the second embodiment;

FIG. 11 is a tabular view listing a typical data reach log of the second embodiment;

DESCRIPTION OF EMBODIMENTS

A computer offering a service on the Internet or the like may transfer the data it has received to another computer offering a different service depending on the nature of the received data. For example, in a file upload service, a server may transfer a file to a Web server which, upon receipt of the file data, may transfer the file in question to another computer that stores files.

Where countermeasures are taken against vulnerability, the routes through which computers are accessed are monitored. If data arriving on the routes is found to include a pattern attacking the vulnerability, it is general practice to block the data in question. It should be noted, however, that some data may be transferred to another computer after being processed by one computer. Checks should then be made as to whether the data to be transferred affects the vulnerability of not only the initial computer but also the next computer to reach, and countermeasures need to be taken accordingly.

In the above-mentioned typical file upload service, it is common practice to monitor the routes through which the Web server is accessed and to block attack patterns regarding the vulnerability affecting the Web server in question. However, since the data of the files received by the Web server is transmitted to another computer that stores files, checks should also be made as to whether the computer for storing the files is vulnerable, and countermeasures should be taken accordingly. That is, the countermeasures to be taken are different depending on how far the data of interest will reach.

The preferred embodiments of the present invention envisage taking countermeasures against vulnerability depending on the reach of data so that the data will not be interrupted more than is necessary. The first embodiment of the invention will emphasize this aspect and explain how to assess the reach of the data and how to take vulnerability countermeasures based on countermeasure policies. The second embodiment of the invention will explain how to visualize the results of the countermeasures taken against vulnerability.

First Embodiment

Figure 1:
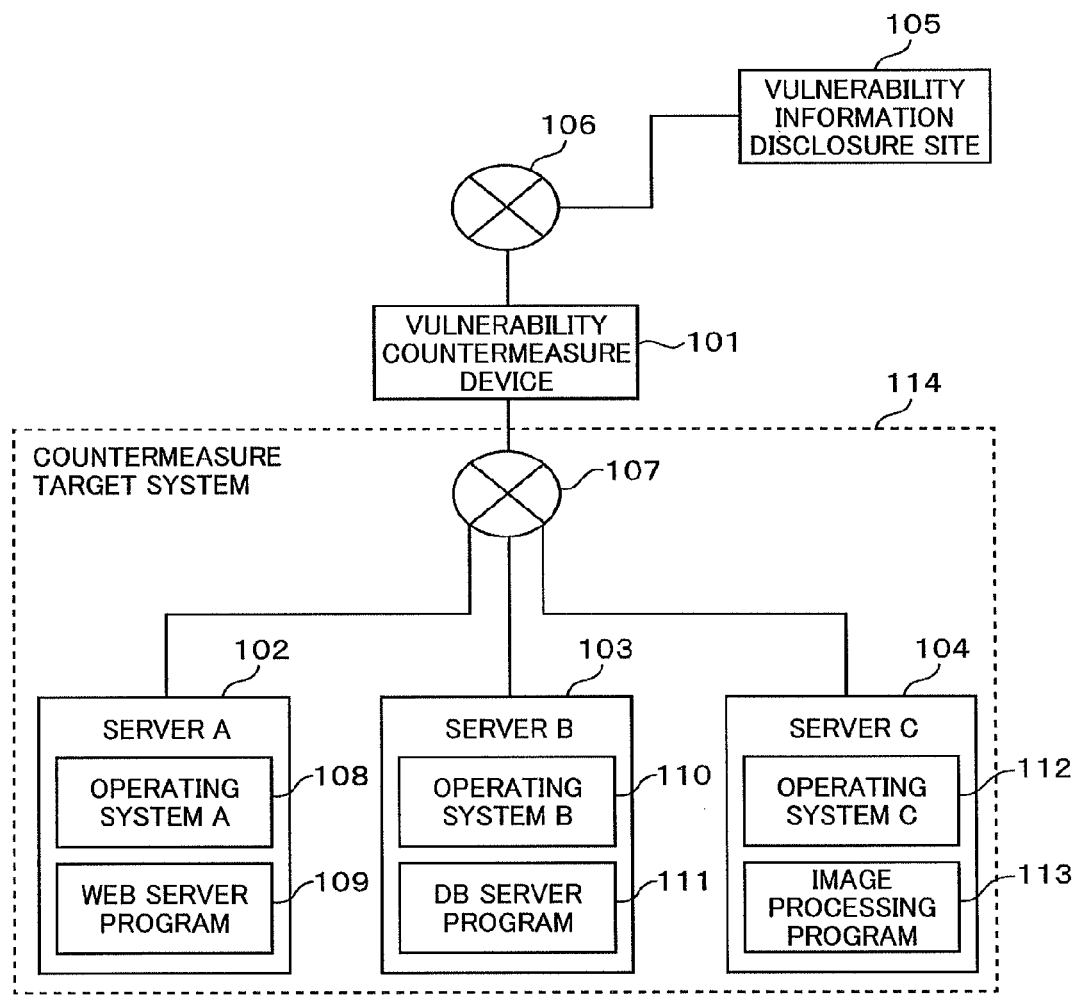
FIG. 1 is a schematic view showing a typical network configuration including a vulnerability countermeasure device as a first embodiment of the present invention.

FIG. 1 shows a typical network configuration including a vulnerability countermeasure device 101 as a first embodiment executing countermeasures against vulnerability in accordance with the reach of data.

The vulnerability countermeasure device 101, interposed between a countermeasure target system 114 and a network 106, manages vulnerability information about the equipment residing in the target system 114. The vulnerability countermeasure device 101 assesses how far the data received via the network 106 will reach, and takes countermeasures on the basis of the countermeasure policies held in the device 101.

The network 106 may be the Internet or the like or a communication network connected thereto, for example. Although not shown in FIG. 1, the network 106 is connected with terminals of the users who utilize the services released by the countermeasure target system 114.

The vulnerability countermeasure device 101 is connected to a vulnerability information disclosure site 105 via the network 106. In this case, the vulnerability information disclosure site 105 may be a domestic or foreign website that discloses information about software vulnerability.

The typical vulnerability information disclosure sites 105 include, for example, JVN (Japan Vulnerability Notes) jointly managed by JPCERT/CC (Japan Computer Emergency Response Team Coordination Center) and Information-Technology Promotion Agency, Japan, and NVD (National Vulnerability Database) managed by NIST (National Institute of Standards and Technology) in the United States.

The countermeasure target system 114 is made up of servers A102, B103 and C104, and a network 107 connecting these servers.

On the server A102, an operating system A108 and a Web server program 109 operate to offer a Web service.

On the server B103, an operating system B110 and a database (DB) server program 111 operate to offer a database service.

On the server C104, an operating system C112 and an image processing program 113 operate to offer an image conversion service.

Here, the server A102 offering its Web service to the outside processes the data received via the network 106, registers the received data with the database service offered by the server B103, or transfers the data to the image conversion service offered by the server C104.

Whereas the countermeasure target system 114 was shown above to be configured of the computers (servers) and the network for purpose of simplification and illustration, the countermeasure target system 114 may be configured alternatively to include FW, IDS, and a load balancer.

Also, whereas the vulnerability countermeasure device 101 was shown above to operate singly, multiple vulnerability countermeasure devices 101 may be configured instead as needed.

Figure 2:
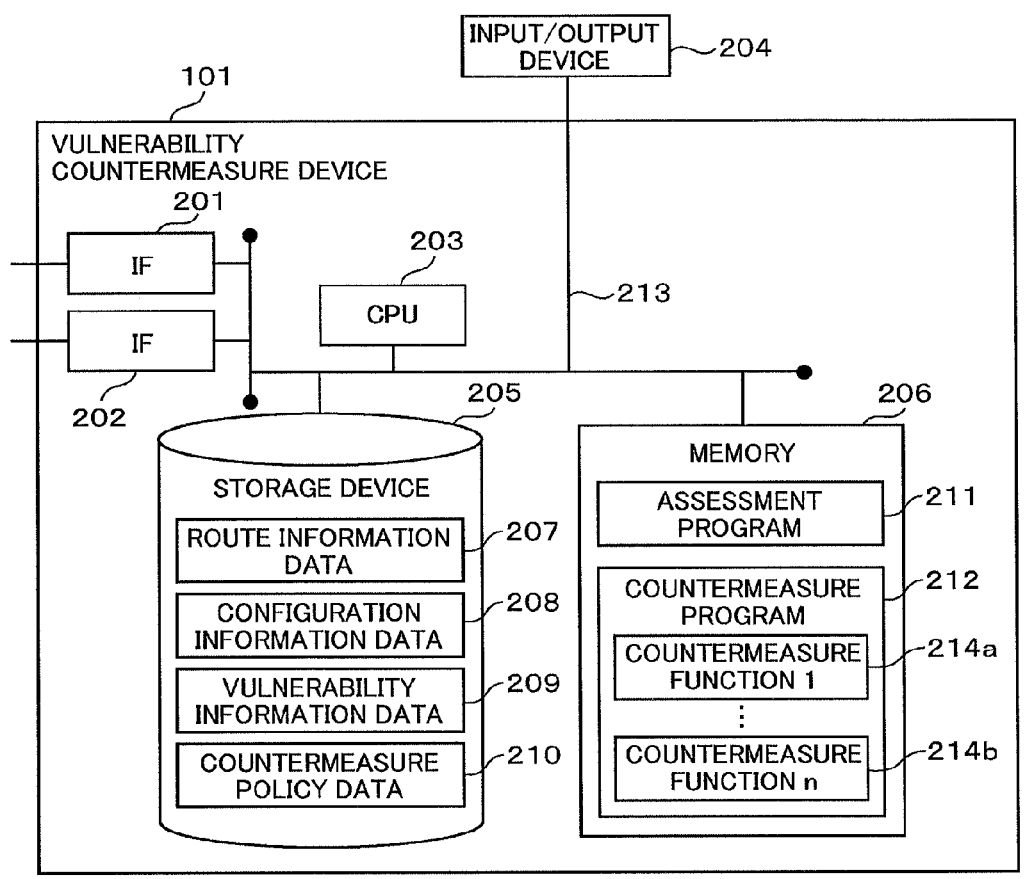
FIG. 2 is a schematic view showing a typical structure of the vulnerability countermeasure device.

FIG. 2 shows a typical structure of the vulnerability countermeasure device 101 that assesses the reach of each data item and takes countermeasures against vulnerability in accordance with the assessed reach of the data. The vulnerability countermeasure device 101 is a computer that includes a CPU (central processing unit) 203, a memory 206 for storing the data necessary for the CPU 203 to perform its processing, a storage device 205 such as a hard disk or a flash memory having a large capacity for storing large amounts of data, interfaces (IF) 201, 202 for communicating with other devices, an input/output device 204 such as a keyboard and a display for executing input and output, and a communication channel (bus) 213 for connecting these configured devices.

The interfaces (IF) may also be called a communication interface or an input/output interface depending on the destination of connections, or called a communication device, a reception device, a transmission device, or an input/output device depending on the operations involved. The communication channel 213 is an information transmission medium such as a bus or a cable.

The CPU 203 executes an assessment program 211 held in the memory 206 to assess the reach of each data item and executes a countermeasure program 212 in the memory 206 to take countermeasures against vulnerability in accordance with policies.

The countermeasure program 212 is structured to include multiple countermeasure functions 214 (1214a through n1214b). The countermeasure functions 214 may include a "check format" function which checks whether the format of given data matches a predetermined format and which discards the data in question if the formats are different; a "remove script" function which, if a character string <script> is found in data, removes the character string up to the corresponding </script> (removes a script tag); a "convert to Jpeg" function which converts the format of given data to Jpeg format; a "discard data" function which discards data; and a "signature matching" function which detects a specific pattern from data and removes the portion of the detected pattern, for example. The "check format" function is based on the assumption that the service provider has defined beforehand the format for each of the parameters involved (to be discussed later).

Countermeasure functions may be added to or deleted from these countermeasure functions 214 as needed. Whereas the countermeasure functions 214 were shown above to be held in the countermeasure program 212 for example, they may be stored alternatively in the memory 206.

The storage device 205 stores route information data 207 for assessing the reach of data, configuration information data 208 for grasping the configuration information about the countermeasure target system 114, vulnerability information data 209 for assessing whether software is vulnerable, and countermeasure policy data 210 constituting the policies regarding vulnerability countermeasures.

Each of the programs and data items mentioned above may be stored beforehand in the memory 206 or storage device 205 or may be installed (loaded) as needed from other devices via the input/output device 204 or the interface 201 or 202.

FIG. 3 shows an example of the route information data 207. As shown in FIG. 3, the route information data 207 includes route ID's 301, hosts 302, paths 303, parameters 304, and routes 305.

The route ID's 301 each denote information (identifier) that uniquely identifies route information.

The hosts 302 each denote the server that offers a specific service. For example, the hosts 302 may be given as domain names or IP addresses that identify individual servers on the computer network. The entry of a given host 302 may also include the port number of a port through which the relevant service is offered.

The paths 303 each denote information indicating how the offered service may be accessed. For example, a given path 303 may be the location of files in the server. Also, the path 303 may include a symbol "/" used to indicate a hierarchical structure.

The combination of a host 302 with a path 303 identifies a specific service offered on the Internet.

The parameters 304 represent information for providing operating conditions for the services. With Web services, their operations are controlled using parameters given to each program so as to meet the preferences of numerous users. The parameters 304 are used to change the operation of the service waiting on the path 303 of a given host 302.

The routes 305 each denote the reach of data. In this context, the reach is information indicative of the servers through which data is transferred. For example, if the route 305 is given as "server A, server B," then the data in question is first processed by the server A and then transmitted to the server B. The routes 305 may also accommodate information about computer identifiers, to be discussed later.

If the parameter 304 contains "-" ("don't care" symbol), that means the data will be transferred through the servers found on the route 305 regardless of the parameter.

If the path 303 contains the symbol "-," that means the data is independent of that path 303. If the host 302 contains the symbol "-," that means the data is independent of that host 302. Multiple these symbols "-" may or may not exist in each piece of route information. For example, if the symbols "-" are found in all of the host 302, path 303, and parameter 304, that means all data will be transferred through the servers found on the route 305.

What follows is a more specific explanation with reference to FIG. 3. For example, in the route information with "1" as the route ID 301, the host 302 is "www.serverA.org," the path 303 is "serverA.cgi," the parameter 304 is "id," and the route 305 is "server A." Under the HTTP protocol, that means the service can be accessed at "http://www.serverA.cgi/serverA.cgi." It also means that the service can accept the parameter "id" and that the value accepted in that parameter "id" is to be processed by the server A102.

The route information contained in the route information data 207 may be input or updated as needed by the service provider.

For example, if the countermeasure target system 114 starts to offer a new service, the service provider registers the route ID, host, path, parameter, and route in the route information data 207. If the countermeasure target system 114 terminates one of its services, the service provider deletes the route ID, host, path, parameter, and route related to the service in question from the route information data 207.

The route information data 207 is used when the assessment program 211 executed by the CPU 203 assesses the reach of data. Specific processing of the assessment program 211 will be discussed later using FIG. 7.

FIG. 4 shows an example of the configuration information data 208. As shown in FIG. 4, the configuration information data 208 includes configuration ID's 401, computer identifiers 402, software 403, and versions 404.

The configuration ID's 401 each denote information (identifier) that can uniquely identify configuration information.

The computer identifiers 402 are identifiers identifying the computers configured in the countermeasure target system 114. Each computer identifier 402 contains an identifier that can correspond to the host 302 in the route information data 207. For example, the host 302 identified as "www.server-A.org" is identical to the computer identified by the computer identifier 402 "Server A."

The software 403 denotes software that is installed in the computer identified by the computer identifier 402. The versions 404 each represent the version of the software in question. If the software of interest has no version, then the version 404 need not be included.

What follows is a specific explanation using FIG. 4. In the configuration information with "1" as the configuration ID 401, the computer identifier 402 is "Server A," the software 403 is "Web server program," and the version 404 is "0.9." This indicates that the Web server program 109 of version 0.9 runs on the server A102.

The configuration information contained in the configuration information data 208 may be input or updated as needed by the service provider. The configuration information may alternatively be collected using a program introduced in each server to collect configuration information (i.e., configuration information collection agent) or the like.

For example, if a new computer is configured into the countermeasure target system 114, the service provider registers the configuration ID, computer identifier, software, and version of the newly configured computer in the configuration information data 208. If a computer is discarded from the configuration, the service provider deletes the configuration ID, computer identifier, software, and version of the discarded computer from the configuration information data 208. The configuration information data 208 is also updated when new software is introduced or discarded.

The configuration information data 208 is used when the assessment program 211 executed by the CPU 203 acquires software installed in servers. Specific processing of the assessment program 211 will be discussed later using FIG. 7.

Figure 5:
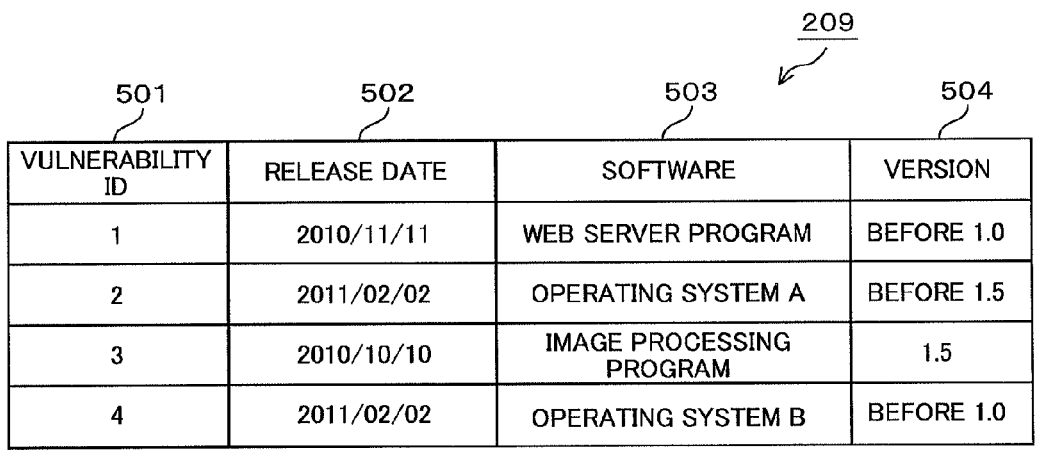
FIG. 5 is a tabular view listing typical vulnerability information data.

FIG. 5 shows an example of the vulnerability information data 209. As shown in FIG. 5, the vulnerability information data 209 includes vulnerability ID's 501, release dates 502, software 503, and versions 504.

The vulnerability ID's 501 each denote information (identifier) that can uniquely identify vulnerability information.

The release dates 502 each represent the date on which vulnerability was announced. The software 503 denotes software susceptible to the announced vulnerability. The versions 504 each represent the version of the software susceptible to the vulnerability in question. As an alternative, the versions 504 may hold information saying "before version such-and-such" indicating all versions prior to a particular version.

What follows is a specific explanation using FIG. 5. For example, in the vulnerability information with "1" as the vulnerability ID 501, the release data 502 is "2010/11/11/," the software 503 is "Web server program," and the version 504 is "Before 1.0." This indicates that vulnerability was found on Nov. 11, 2011, in the Web server programs of the versions before 1.0.

For purpose of simplification and illustration, the vulnerability information data 209 was shown above to include the release dates 502, software 503, and versions 504. Alternatively, the vulnerability information data 209 may further include information indicating eventual effects of vulnerability, the presence or absence of countermeasure patches against vulnerability, CVSS (Common Vulnerability Scoring System) values representing degrees of severity of vulnerability, or information about countermeasures to be taken against vulnerability as needed.

The service provider checks the vulnerability information disclosure sites 105 periodically and, whenever new vulnerability is disclosed, causes information about the new vulnerability to be reflected in the vulnerability information data 209. As an alternative, the service provider may use suitable tools to automate updating of the vulnerability information data 209.

The vulnerability information data 209 is used when the assessment program 211 executed by the CPU 203 assesses whether there is a vulnerability in the software installed in servers. Specific processing of the assessment program 211 will be discussed later using FIG. 7.

Figure 6:
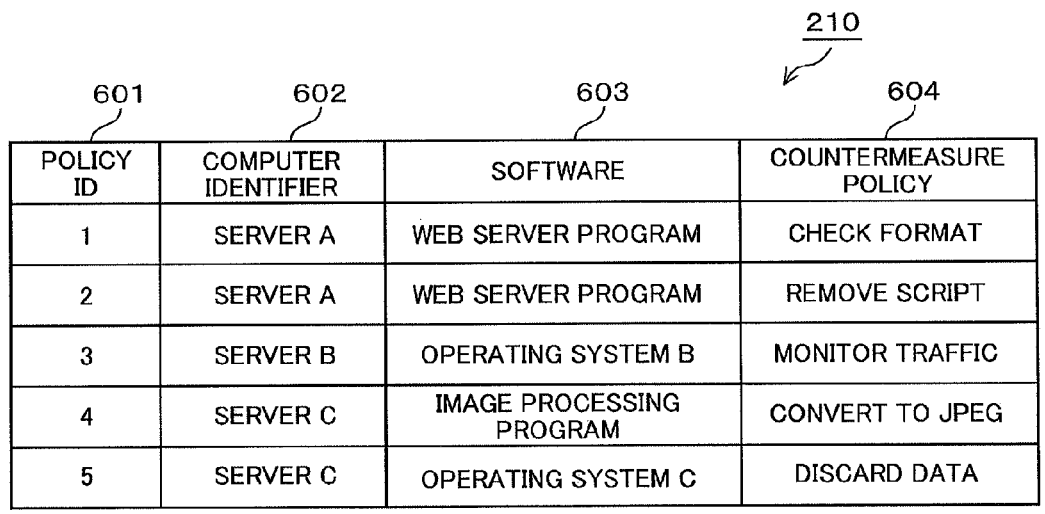
FIG. 6 is a tabular view listing typical countermeasure policy data.

FIG. 6 shows an example of the countermeasure policy data 210. As shown in FIG. 6, the countermeasure policy data 210 includes policy ID's 601, computer identifiers 602, software 603, and countermeasure policies 604.

The policy ID's 601 each represent information (identifier) that can uniquely identify a countermeasure policy.

The computer identifiers 602 are each an identifier identifying a computer configured in the countermeasure target system 114. It should be noted that the computer identifiers 602 are the same as the computer identifiers 402 in the configuration information data 208.

The software 603 denotes the software that is vulnerable.

The countermeasure policies 604 each represent a policy to be followed where there exists the effect of vulnerability. For example, the policies may include "check format," "remove script," "convert to Jpeg," and "discard data." Whereas these countermeasures are the policies for averting the effects of vulnerability, there may also be provided policies for reinforcing surveillance where vulnerability exists, such as a "monitor traffic" policy.

These policies are executed by the countermeasure functions 214 built in the countermeasure program 212 of the vulnerability countermeasure device 101.

For example, the "check format" countermeasure policy involves verifying whether the value of the parameter included in the received data matches the format expected of the parameter in question. Specifically, if the expected format is an integer, then a check is made to determine whether the received value is data consisting only of any one of integers 0 through 9. If the expected format is a gif image, a check is made to determine whether the received value matches the specifications of the gif file. If the "check format" policy has failed (i.e., in the event of a format mismatch), the corresponding value is removed.

The "remove script" countermeasure policy involves removing the script from the value of the parameter included in the received data. Specifically, the <script> tags are removed.

The "convert to Jpeg" countermeasure policy involves converting the value of the parameter included in the received data to Jpeg format.

The countermeasure policy data 210 indicates that if there exists a vulnerability in the software 603 operating on the computer identified by the computer identifier 602, the countermeasure represented by the countermeasure policy 604 is executed.

A specific example is explained below using FIG. 6. In the countermeasure policy data 210 with "1" as the policy ID, the computer identifier 602 is "Server A," the software 603 is "Web server program," and the countermeasure policy 604 is "check format." This indicates that if there is a vulnerability in the Web server program 109 of the server A102, the "check format" vulnerability countermeasure is executed.

The countermeasure policies contained in the countermeasure policy data 210 may be added or updated as needed by the service provider. In addition to the countermeasure policies, it is also necessary to build into the countermeasure program 212 the countermeasure functions 214 for executing theses countermeasure policies.

For purpose of simplification and illustration, the countermeasure policy data 210 was shown above to include the policy ID's 601, computer identifiers 602, software 603, and countermeasure policies 604. Alternatively, the countermeasure policy data 210 may further include CVSS values or the like representing degrees of severity of vulnerability, and the countermeasure policies may be changed in accordance with the CVSS values.

The countermeasure policy data 210 is used when the countermeasure program 212 executed by the CPU 203 carries out countermeasures to avert the effects of vulnerability. Specific processing of the countermeasure program 212 will be discussed later using FIG. 8.

Figure 7:
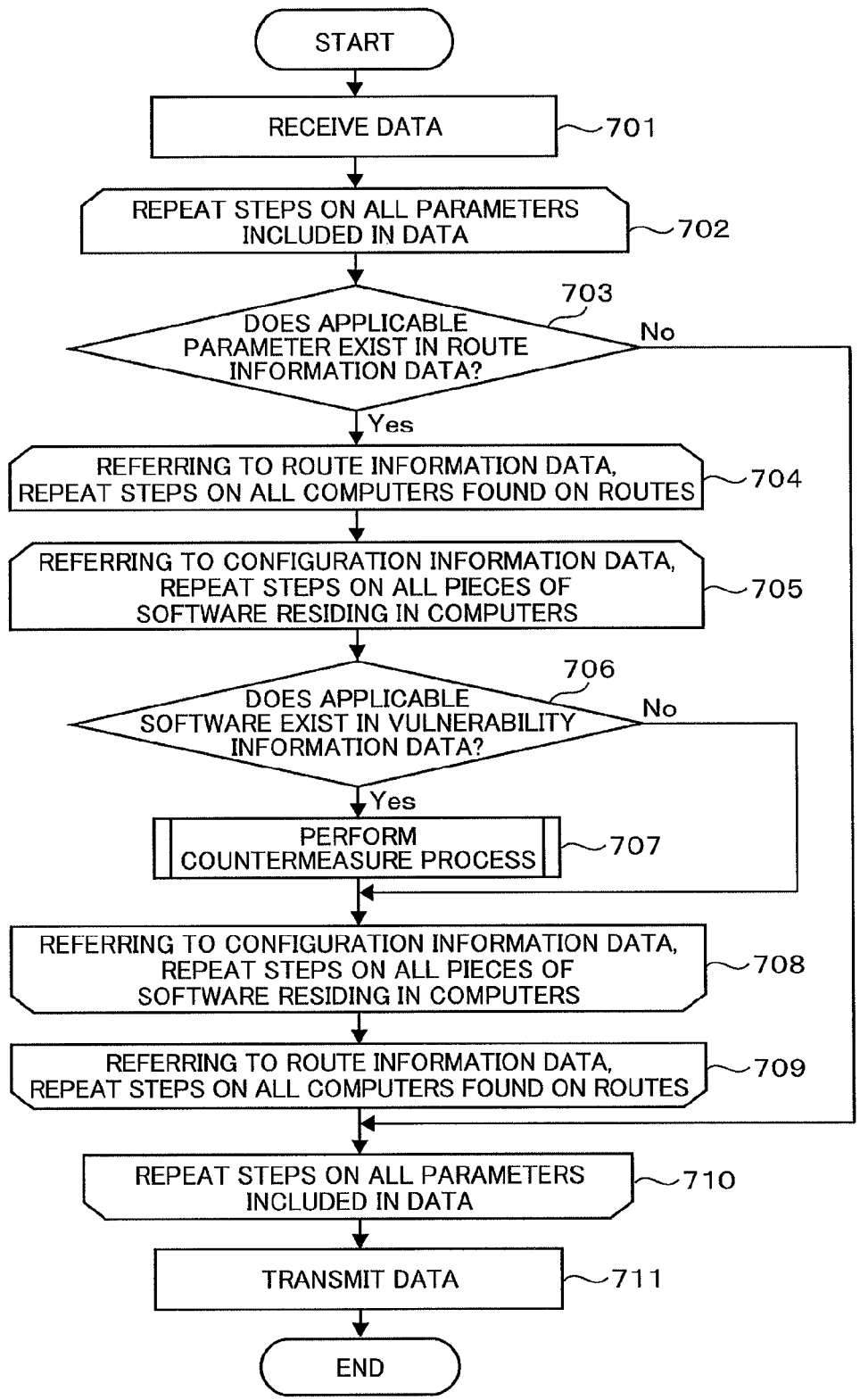
FIG. 7 is a flowchart of an assessment process.

Explained next is the process of assessing (assessment process) whether there resides vulnerable software in the server on the path reached by the data received by the assessment program 211 of the vulnerability countermeasure device 101. FIG. 7 is a flowchart of the assessment process.

As shown in FIG. 7, the assessment program 211 executing the assessment process is carried out by the CPU 203. Upon receipt of packets via the interface 201 from a user's terminal connected to the network 106, the assessment program 211 concatenates the received packets to restore the data (step 701).

From the restored data, the assessment program 211 acquires the host, path, parameter, and value information. The assessment program 211 repeats the process of steps 703 through 709 on each of all parameters acquired (step 702).

The assessment program 211 compares the host, path, and parameter information acquired in step 702 with the hosts 302, paths 303, and parameters 304 in the route information data 207. If there exists the applicable route information, the assessment program 211 goes to step 704. If there is no applicable route information, the assessment program 211 goes to step 710 (step 703).

The assessment program 211 acquires the computer identifier described on the route 305 in the route information data 207 found applicable in step 703. The assessment program 211 repeats the process of steps 705 through 708 on each of all computer identifiers acquired (step 704).

The assessment program 211 compares the computer identifier acquired in step 704 with the computer identifiers 402 in the configuration information data 208 to obtain the software 403 and version 404 of the applicable configuration information. The assessment program 211 repeats the process of steps 706 and 707 on all acquired pieces of software 403 and versions 404 (step 705).

The assessment program 211 compares the software and version acquired in step 705 with the software 503 and versions 504 of the vulnerability information data 209. If there exists the applicable vulnerability information, the assessment program 211 goes to step 707. If there is no applicable vulnerability information, the assessment program 211 goes to step 708.

The assessment program 211 executes the countermeasure program 212 to carry out the countermeasures (step 707). Specific processing of the countermeasure program 212 will be discussed later using FIG. 8.

The assessment program 211 divides the received data into packets, transmits the packets via the interface 202, and terminates the processing (step 711).

The flow of the assessment process from step 702 to step 710 is explained below using a specific example. For example, upon receipt of data "http://www.serverA.org/serverA.cgi?id=123&cmd=update," the assessment program 211 acquires from the receive data a host "www.serverA.org," a path "serverA.cgi," parameters "id" and "cmd," and values "123" and "update." In this case, there are two parameters "id" and "cmd," so that the process of steps 703 through 709 is carried out on each of these two parameters.

The assessment program 211 compares the first parameter "id" with the route information data 207. In this case, the route ID 301 "1" corresponds to the host 302 "www.serverA.org," path 303 "serverA.cgi," and parameter 304 "id." The assessment program 211 acquires the computer identifier "Server A" stored on the route 305 in the applicable route information.

It will be appreciated from the above steps that the value "123" corresponding to the parameter "id" is processed by "Server A."

The assessment program 211 compares the acquired computer identifier "Server A" with the computer identifiers 402 in the configuration information data 208. In this case, the configuration ID "1" corresponds to the computer identifier 402 "Server A," and the configuration ID "2" also corresponds to the computer identifier 402 "Server A." The process of steps 706 and 707 is repeated on each of the two pieces of software "Web server program" and "Operating system A," because there are two items of the applicable configuration information here.

It will be appreciated from the above steps that the two pieces of software "Web server program" and "Operating system A" run on "Server A."

The assessment program 211 compares the first software "Web server program" and the first version "0.9" with the software 503 and versions 504 in the vulnerability information data 209. In this case, the vulnerability ID "1" corresponds to the software 503 "Web server program" and version 504 "Before 1.0." The assessment program 211 executes the countermeasure program 212, sending the computer identifier "Server A," software "Web server program," version "0.9," parameter "id," and value "123" to the countermeasure program 212, because there exists the applicable vulnerability information here.

Specific processing of the countermeasure program 212 will be discussed later using FIG. 8.

The assessment program 211 compares the second software "Operating system A" and the second version "2.3" with the software 503 and versions 504 in the vulnerability information data 209. In this case, the countermeasure process (step 707) is not carried out because there is no applicable vulnerability information.

Next, the assessment program 211 compares the second parameter "cmd" with the route information data 207. In this case, the route ID 301 "2" corresponds to the host 302 "www.serverA.org," path 303 "serverA.cgi," and parameter 304 "cmd." The assessment program 211 acquires the computer identifiers "Server A, Server B" stored on the route 305 in the applicable route information.

It will be appreciated from the above steps that the value "update" corresponding to the parameter "cmd" is processed by "Server A" and "Server B." In this case, there exist two servers on the route, so that the process of steps 705 through 708 is repeated on each of the two computer identifiers "Server A" and "Server B."

The assessment program 211 compares the first computer identifier "Server A" with the computer identifiers 402 in the configuration information data 208. In this case, the configuration ID's "1" and "2" correspond to the computer identifier 402 "Server A." The process of steps 706 and 707 is repeated on each of the two pieces of software "Web server program"

and "Operating system A," because there are two items of the applicable configuration information.

The assessment program 211 compares the first software "Web server program" and the first version "0.9" with the software 503 and versions 504 in the vulnerability information data 209. In this case, the vulnerability ID "1" corresponds to the software 503 "Web server program" and version 504 "Before 1.0." The assessment program 211 executes the countermeasure program 212, sending the computer identifier "Server A," software "Web server program," parameter "cmd," and value "update" to the countermeasure program 212, because there exists the applicable vulnerable information.

Specific processing of the countermeasure program 212 will be discussed later using FIG. 8.

The assessment program 211 compares the second software "Operating system A" and the second version "2.3" with the software 503 and versions 504 in the vulnerability information data 209. In this case, there is no applicable vulnerability information, so that the countermeasure process (step 707) is not carried out.

The assessment program 211 compares the second computer identifier "Server B" with the computer identifiers 402 in the configuration information data 208. In this case, the configuration ID's "3" and "4" correspond to the computer identifier 402 "Server B." The process of steps 706 and 707 is repeated on each of two pieces of software "DB server program" and "Operating system B," because there exist two items of the applicable configuration information.

The assessment program 211 compares the first software "DB server program" and the first version "2.3" with the software 503 and versions 504 in the vulnerability information data 209. In this case, there is no applicable vulnerability data, so that the countermeasure process (step 707) is not carried out.

The assessment program 211 compares the second software "Operating system B" and the second version "0.5" with the software 503 and versions 504 in the vulnerability information data 209. In this case, the vulnerability ID "4" corresponds to the software 503 "Operating system B" and version 504 "Before 1.0." The assessment program 211 executes the countermeasure program 212, sending the computer identifier "Server B," software "Operating system B," parameter "cmd," and value "update" to the countermeasure program 207, because there exists the applicable vulnerability information.

As described above, the assessment program 211 analyzes which computer will be reached by the received data, acquires information about the software residing in the computer in question, and assesses whether there is a vulnerability in each piece of the acquired software. If any software is assessed to be vulnerable, the assessment program 211 starts the countermeasure program 212.

Explained next is the process of executing the countermeasures (i.e., called the countermeasure process hereunder) to avert the effects of vulnerability when a countermeasure process request is received from the assessment program 211 by the countermeasure program 212 of the vulnerability countermeasure device 101. FIG. 8 is a flowchart of the countermeasure process.

Figure 8:
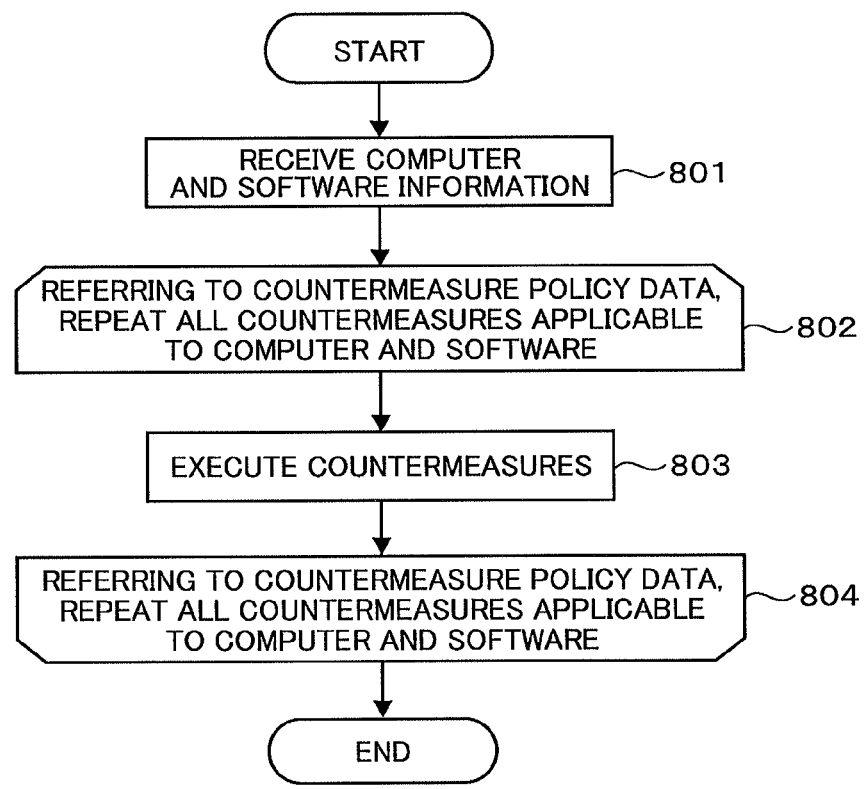
FIG. 8 is a flowchart of a countermeasure execution process.

As shown in FIG. 8, the countermeasure program 212 executing the countermeasures is carried out by the CPU 203. The countermeasure program 212 first receives a countermeasure process request from the assessment program 211 (step 801). The countermeasure process request includes the computer identifier identifying the vulnerable computer, the vulnerable software, the parameter reaching the vulnerable computer, and parameter value information.

The countermeasure program 212 compares the received computer identifier and software with the computer identifiers 602 and software 603 in the countermeasure policy data 210 to acquire the applicable countermeasure policies 604. The countermeasure program 212 repeats the process of step 803 on each of all acquired countermeasure policies 604 (step 802).

Using the countermeasure functions 214, the countermeasure program 212 executes the countermeasures to avert the effects of vulnerability based on the acquired countermeasure policies 604 (step 803).

The flow of the countermeasure process from step 801 to step 803 is explained below using a specific example.

If, for example, the computer identifier "Server A," software "Web server program," parameter "id," and value information "123" are sent from the assessment program 211, the countermeasure program 212 compares the received computer identifier "Server A" and software "Web server program" with the computer identifiers 602 and software 603 in the countermeasure policy data 210. In this case, the policy ID's "1" and "2" correspond to the computer identifier 602 "Server A" and software 603 "Web server program. The process of step 803 is repeated on each of the two countermeasure policies, because there exist two applicable countermeasure policies "check format" and "remove script."

The countermeasure program 212 executes the first countermeasure policy "check format." Specifically, the countermeasure program 212 calls up the countermeasure function 214 that executes format check and acquires the format of the parameter "id" received from the assessment program 211, from the information held in the countermeasure function 214 in question. It is assumed here that the format of the parameter "id" is defined as "integer." The countermeasure function 214 then verifies whether the value "123" of the parameter "id" matches the format "integer." The check as to whether the parameter value matches the integer format involves ascertaining whether the value "123" is composed of a numerical value. In this case, the value "123" is an integer, so that the countermeasure function 214 does not discard the data.

The countermeasure program 212 executes the second countermeasure policy "remove script." Specifically, the countermeasure program 212 calls up the countermeasure function 214 that performs script removal to remove the <script> tags in the value "123" received from the assessment program 212. In this case, the value "123" does not contain any <script> tag, so that the countermeasure function 214 does not change the data.

As described, in the vulnerability countermeasure device 101 for taking countermeasures against vulnerability, the assessment program 211 receives data via the interface 201, calculates from the received data the computer to be reached by the data on the basis of the route information data 207, and assesses whether there is a vulnerability in the software residing in the calculated computer. The countermeasure program 212 executes the countermeasures against the vulnerability in accordance with the countermeasure policy data 210, which makes it possible to prevent the data from being interrupted more than is necessary.

The above embodiment may be partially modified as follows: The countermeasure functions 214 executing the countermeasure process may be introduced into each server as an agent. The countermeasure program 212 of the vulnerability countermeasure device 101 may then issue countermeasure instructions to each of the agents to avert the effects of vulnerability. This arrangement allows the countermeasure process to be performed on each server, thus alleviating the workload of the countermeasure process on the vulnerability countermeasure device 101.

Also, unavailable software and its versions may be registered in the vulnerability information data 209. This makes it possible to execute the countermeasures regarding the unavailable software.

Furthermore, multiple vulnerability countermeasure devices 101 may be provided and operated in coordination with one another. This configuration makes it possible to distribute the workload throughout the vulnerability countermeasure devices.

Second Embodiment

A second embodiment includes the vulnerability countermeasure device of the first embodiment and further permits visualization of the results of vulnerability countermeasures.

With the first embodiment, it is difficult to verify which of the computers has vulnerable software or what kinds of vulnerability countermeasures are being taken on which computer.

Thus the second embodiment is provided as a vulnerability countermeasure device that visualizes the results of countermeasures taken against vulnerability. Visualizing the results of vulnerability countermeasure execution allows the service provider to know quickly the results of the countermeasures executed against vulnerability.

Figure 9:
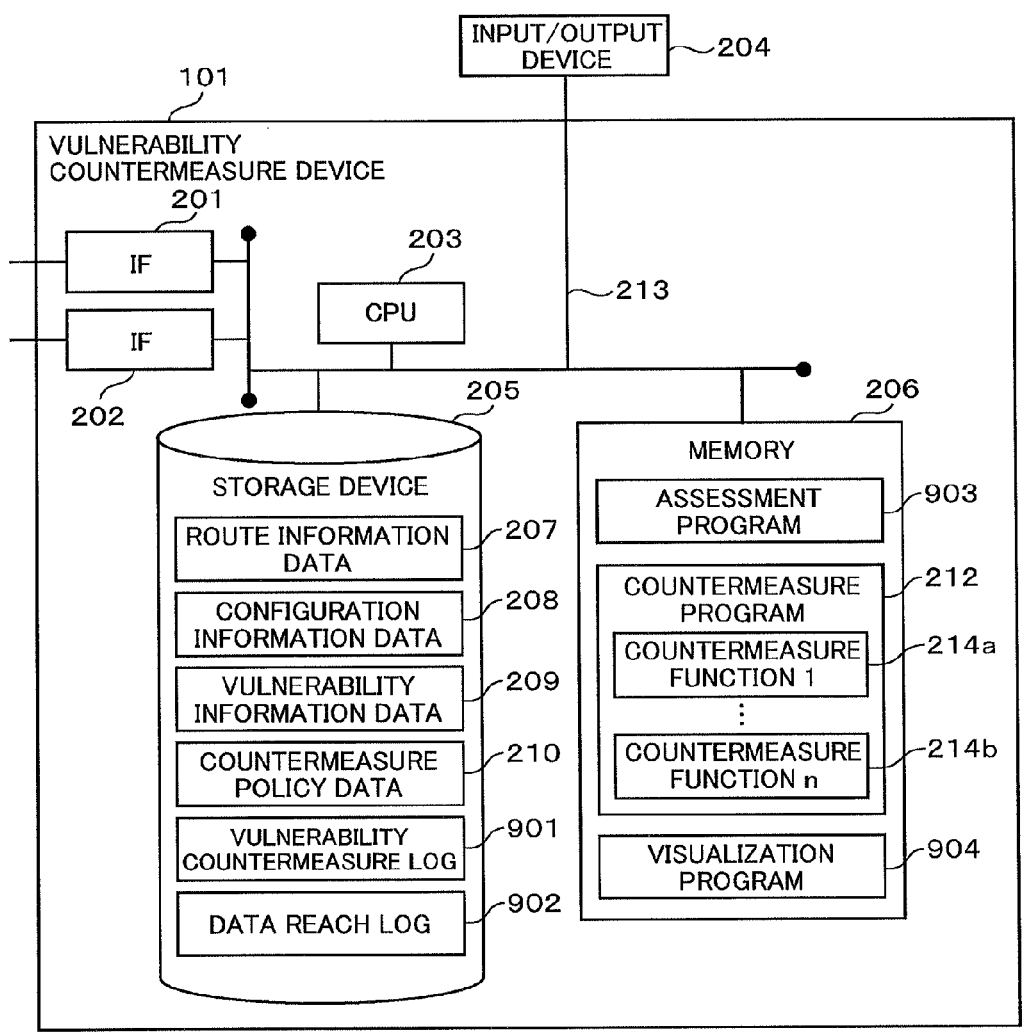
FIG. 9 is a schematic view showing a typical structure of a vulnerability countermeasure device as a second embodiment of the present invention.

FIG. 9 shows a typical structure of the vulnerability countermeasure device 101 as the second embodiment. The same components as those in the first embodiment are designated by the same reference numerals, and their explanations are omitted. The ensuing description will focus on the points that make the second embodiment different from the first embodiment.

As shown in FIG. 9, the vulnerability countermeasure device 101 of the second embodiment is configured as a vulnerability countermeasure device 101 of the first embodiment that is supplemented with a vulnerability countermeasure log 901, a data reach log 902, an assessment program 903, and a visualization program 904. Although the assessment program 211 already exists in the first embodiment, the assessment program 903 of the second embodiment is given a new reference numeral because the latter provides partially different processing.

The CPU 203 assesses the reach of data by performing the assessment program 903 held in the memory 206 and visualizes the results of the countermeasures taken by carrying out the visualization program 904. The storage device 205 stores the vulnerability countermeasure log 901 that retains vulnerability countermeasure status and the data reach log 902 that holds the amounts of reached data.

The above programs and data may each be stored beforehand in the memory 206 or storage device 205 or may be installed (loaded) as needed from other devices via the input/output device 204 or through the interfaces 201 and 202.

FIG. 10 lists a typical vulnerability countermeasure log 901. As shown in FIG. 10, the vulnerability countermeasure log 901 includes computer identifiers 1001, software 1002, vulnerability ID's 1003, and countermeasure ID's 1004.

The computer identifiers 1001 hold the identifiers of the computers configured in the countermeasure target system 114. These identifiers are the same as the computer identifiers 402 in the configuration information data 208.

The software 1002 holds the software that is vulnerable.

The vulnerability ID's 1003 hold vulnerability information about the software 1002 operating on the computers identified by the computer identifiers 1001. These identifiers are the same as those of the vulnerability information 501 in the vulnerability information data 209.

The countermeasure ID's 1004 hold information about the countermeasure policies being executed. These identifiers are the same as those of the policy ID's 601 in the countermeasure policy data 210.

The vulnerability countermeasure log 901 indicates that the vulnerability identified by the vulnerability ID 1003 exists in the software 1002 residing in the computer identified by the computer identifier 1001 and that the countermeasure identified by the countermeasure ID 1004 is being executed.

A specific example is explained using FIG. 10. In the vulnerability log entries in the first row, the computer identifier 1001 is "Server A," the software 1002 is "Web server program," the vulnerability ID 1003 is "1," and the countermeasure ID's 1004 are "1, 2." This log indicates that the vulnerability identified by the vulnerability ID 1003 "1" exists in the Web server program 109 on the server A 102 and that the countermeasures identified by the countermeasure ID's "1" and "2" (i.e., "check format" and "remove script") are being executed.

The log information stored in the vulnerability countermeasure log 901 is deleted when the service provider has taken the relevant countermeasures.

The vulnerability countermeasure log 901 is used when the assessment program 903 executed by the CPU 203 assesses whether there is a vulnerability in computers. Specific processing of the assessment program 903 will be discussed later using FIG. 13.

The vulnerability countermeasure log 901 is also used when the visualization program 904 executed by the CPU 203 visualizes countermeasure results. Specific processing of the visualization program 904 will be discussed later using FIG. 14.

FIG. 11 lists a typical data reach log 902. As shown in FIG. 11, the data reach log 902 includes hosts 1101, paths 1102, computer identifiers 1103, and data amounts 1104.

The hosts 1101 hold information as to which server offers services. For example, the hosts 1101 may be denoted by the domain names and IP addresses identifying individual servers on the computer network. The hosts 1101 may also include the port numbers of the ports through which services are offered. The hosts 1101 hold the same identifiers as those of the hosts 302 in the route information data 207.

The paths 1102 hold information as to how the offered services may be accessed. For example, the paths may be given as the locations of relevant files inside the servers. The paths 1102 may also include slash symbols "/" indicative of a hierarchical structure. The paths 1103 hold the same identifiers as those of the paths 303 in the route information data 207.

The combinations of the hosts 1101 with the paths 1102 identify the services offered on the Internet.

The computer identifiers 1103 hold the identifiers of the computers configured in the countermeasure target system 114. These identifiers are the same as the computer identifiers 402 in the configuration information data 208.

The data amounts 1104 hold the amounts of the data having reached the computers identified by the computer identifiers 1103. For example, a data amount 1104 may be the number of characters making up given data.

What is indicated by the data reach log 902 is that, of the data received by the services offered by the hosts 1101 and paths 1102, those processed by the computers identified by the computer identifiers 1103 are as many as the data amounts 1104.

A specific example is explained using FIG. 11. In the data reach log entries in the first row, the host 1101 is "www.serverA.org," the path 1102 is "serverA.cgi," the computer identifier 1103 is "Server A," and the data amount 1104 is "300." This log indicates that, of the data having reached the service offered at "http://www.serverA.org/serverA.cgi," the data having reached the server A102 are as many as 300.

The data reach log 902 is used when the visualization program 904 executed by the CPU 203 visualizes countermeasure results. Specific processing of the visualization program 904 will be discussed later using FIG. 14.

Figure 12:
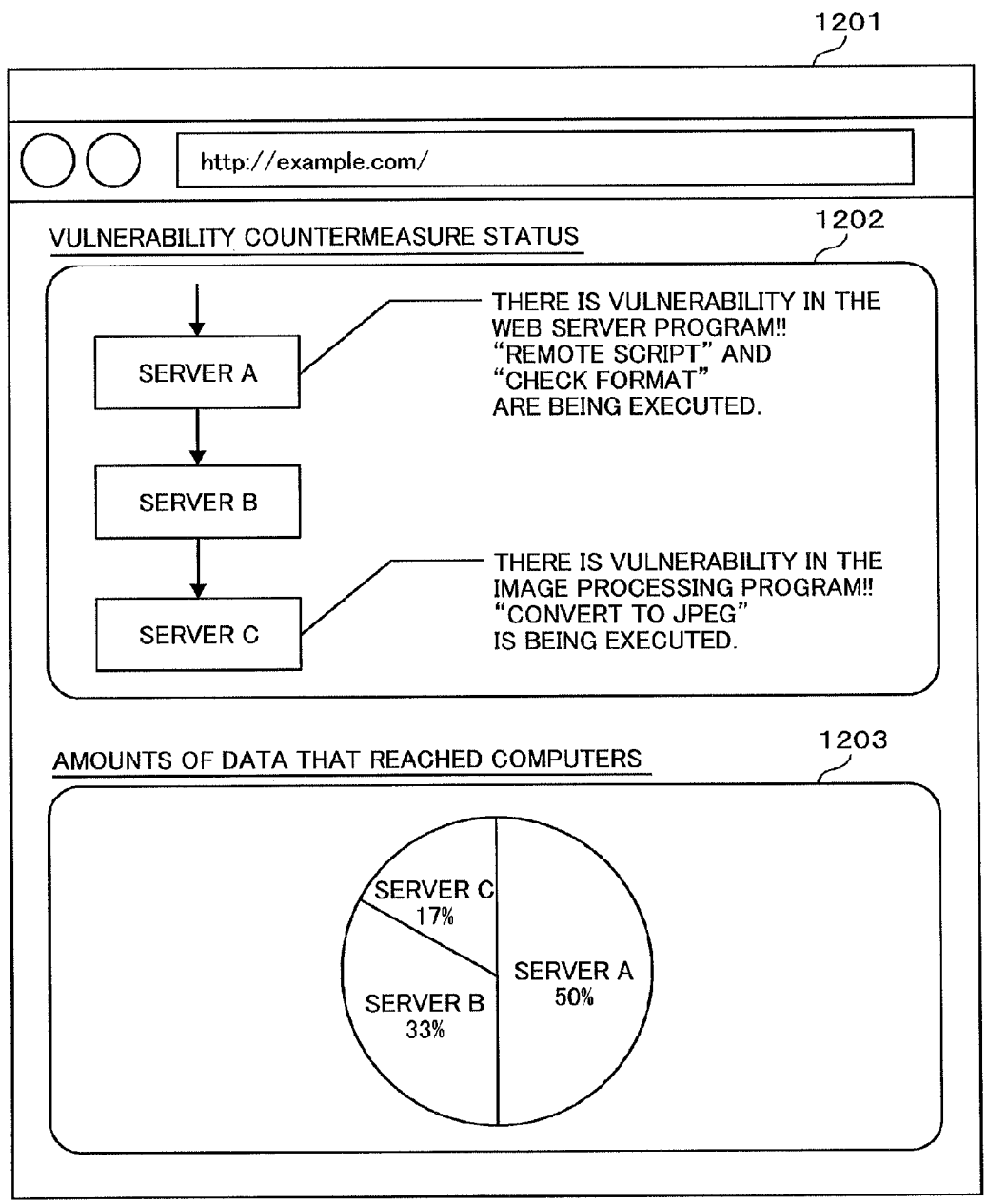
FIG. 12 is a schematic view showing a typical countermeasure result visualization screen of the second embodiment.

FIG. 12 shows a typical countermeasure result visualization screen 1201. As shown in FIG. 12, the countermeasure result visualization screen 1201 includes an area 1202 for displaying vulnerability countermeasure status and an area 1203 for displaying the amounts of the data having reached servers.

The area 1202 for displaying vulnerability countermeasure status indicates what kinds of countermeasures are being executed on which computer, together with the computers transited by the data of interest and the order in which the data transmits the computers. In this example, the vulnerability countermeasure status display area 1202 displays vulnerability countermeasure status in effect where there is a vulnerability in the software "Web server program" on the computer identified by the computer identifier "Server A" so that the countermeasures of the countermeasure policies "remove script" and "check format" are being executed, and where there is a vulnerability in software "Image processing program" on the computer identified by the computer identifier "Server C" so that the countermeasure of the countermeasure policy "convert to Jpeg" is being executed.

The area 1203 displaying the amounts of the data having reached servers indicates how much data is processed by which computer, using a pie chart or the like.

Upon receipt of a visualization request from the user, the visualization program 904 outputs the countermeasure result visualization screen 1201. Specific processing of the visualization program 904 will be discussed later using FIG. 14.

Figure 13:
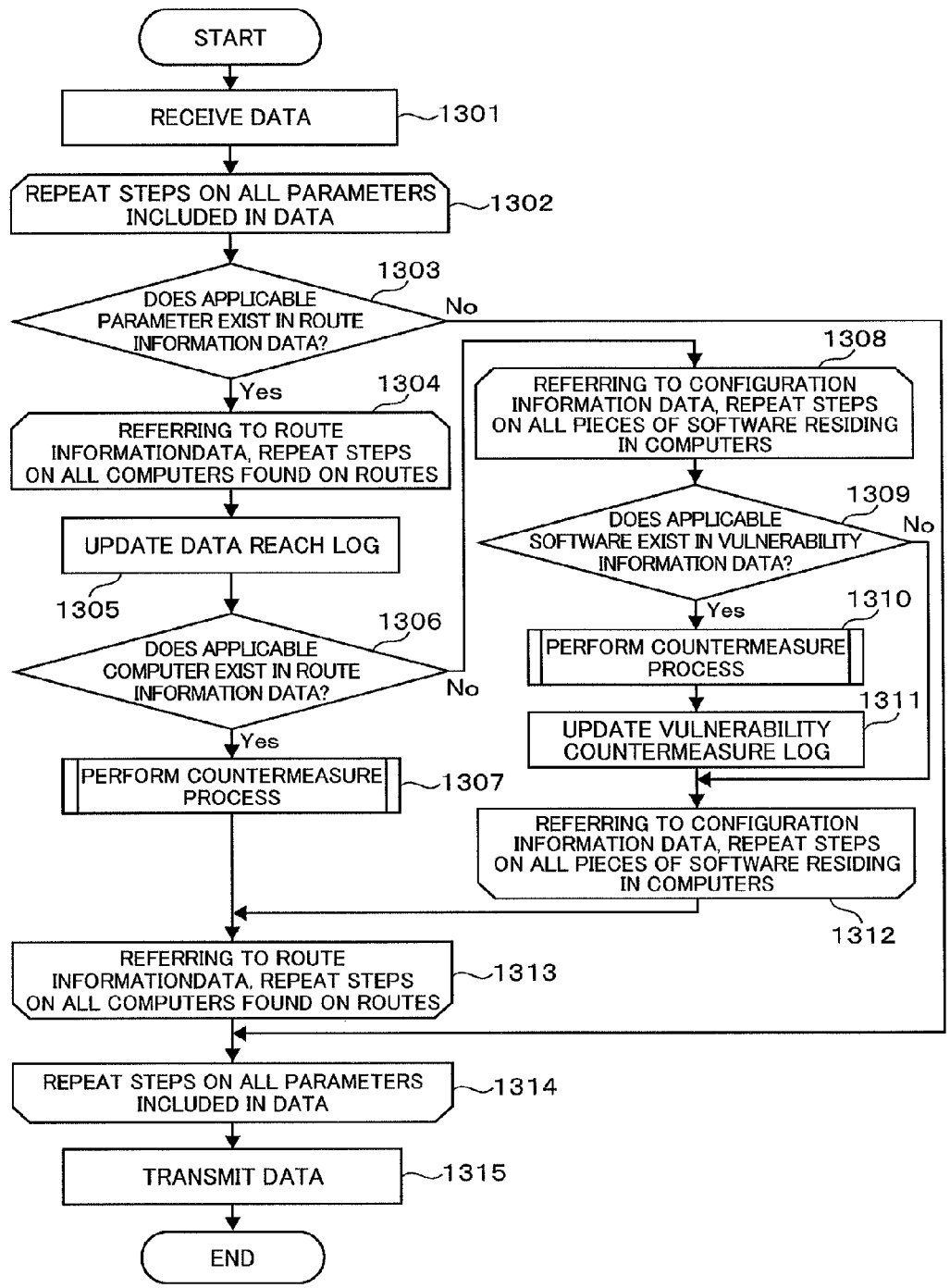
FIG. 13 is a flowchart of an assessment process of the second embodiment.

Explained next is the process of assessing (called the assessment process hereunder) whether there resides vulnerable software in the servers on the route reached by the data received by the assessment program 903 of the vulnerability countermeasure program 101. FIG. 13 is a flowchart of the assessment process.

As shown FIG. 13, the assessment program 903 executing the assessment program is carried out by the CPU 203. Upon receipt of packets via the interface 201 from a user's terminal connected to the network 106, the assessment program 903 concatenates the received packets to restore the data (step 1301).

From the restored data, the assessment program 903 acquires the host, path, parameter, and value information. The assessment program 903 repeats the process of steps 1303 through 1314 on each of all parameters acquired (step 1302).

The assessment program 903 compares the host, path, and parameter information acquired in step 1302 with the hosts 302, paths 303, and parameters 304 in the route information data 207. If there exists the applicable route information, the assessment program 903 goes to step 1304. If there is no applicable route information, the assessment program 903 goes to step 1314 (step 1303).

The assessment program 903 acquires the computer identifier stated on the route 305 in the route information data 207 found applicable in step 1303. The assessment program 903 repeats the process of steps 1305 through 1313 on each of all computer identifiers acquired (step 1304).

Based on the host, path, parameter, and value acquired in step 1302 as well as on the computer identifier obtained in step 1304, the assessment program 903 increments the data amount 1104 in the data reach log 902 by the data amount of the value (step 1305).

Suppose that data "http://www.serverA.cgi?id=123" is received when the host 1101 is "www.serverA.org," the path 1102 is "serverA.cgi," the computer identifier 1103 is "Server A," and the data amount 1104 is "300." In this case, the value "123" corresponding to the parameter "id" is known to be processed by the computer identified by the computer identifier "Server A," according to the route information data 207. Thus the assessment program 903 increments the data amount 1104 "300" by the data amount "3" (number of characters) of the value "123," thereby updating the data amount 1104 to "303."

The assessment program 903 compares the computer identifier acquired in step 1304 with the computer identifiers 1001 in the vulnerability countermeasure log 901. If there exists the applicable vulnerability countermeasure log, the assessment program 903 goes to step 1307. If there is no applicable vulnerability countermeasure log, the assessment program 903 goes to step 1308 (step 1306).

When comparisons are made with the vulnerability countermeasure log 901 in this manner, it is possible to omit the process of assessing whether there is a vulnerability in each piece of software. This contributes to alleviating the workload involved in the assessment process.

The assessment program 903 compares the computer identifier acquired in step 1304 with the computer identifiers 402 in the configuration information data 208 so as to acquire the software 403 and versions 404 of the applicable configuration information. The assessment program 903 repeats the process of steps 1309 through 1302 on each of all pieces of software 403 and of their versions 404 thus acquired (step 1308).

The assessment program 903 compares the software and version acquired in step 1308 with the software 503 and versions 504 in the vulnerability information data 209. If there exists the applicable vulnerability information, the assessment program 903 goes to step 1310. If there is no applicable vulnerability information, the assessment program 903 goes to step 1312 (step 1309).

The assessment program 903 executes the countermeasure program 212 to carry out the countermeasures (step 1310). The specific processing of the countermeasure program 212 was discussed above in conjunction with the first embodiment.

The assessment program 903 stores into the vulnerability countermeasure log 901 the computer identifier acquired in step 1304, the software acquired in step 1308, the vulnerability ID obtained in step 1309, and the countermeasure ID obtained in step 1310 (step 1311).

The process above stores into the countermeasure log 901 the applicable vulnerability information to be used in the subsequent comparisons with the countermeasure log 901. This makes it possible to omit the process of assessing whether there is a vulnerability in each piece of software.

The assessment program 903 divides the received data into packets, transmits the packets via the interface 202, and terminates the processing (step 1315).

The flow of the assessment process from step 1302 to step 1314 is explained below using the same specific example as that discussed above in conjunction with the first embodiment. It is assumed that data has yet to be stored in the vulnerability countermeasure log 901 and data reach log 902. In this example, upon receipt of data "http://www.serverA.org/serverA.cgi?id=123&cmd=update," the assessment program 903 acquires from the receive data a host "www.serverA.org," a path "serverA.cgi," parameters "id" and "cmd," and values "123" and "update." In this case, there are two parameters "id" and "cmd," so that the process of steps 1303 through 1313 is carried out on each of these two parameters.

The assessment program 903 compares the first parameter "id" with the route information data 207. In this case, the route ID 301 "1" corresponds to the host 302 "www.serverA.org," path 303 "serverA.cgi," and parameter 304 "id." The assessment program 903 acquires the computer identifier "Server A" stored on the route 305 in the applicable route information.

It will be appreciated from the above steps that the value "123" corresponding to the parameter "id" is processed by "Server A."

The assessment program 903 stores into the data reach log 902 the host "www.serverA.org," path "serverA.cgi," computer identifier "Server A," and data amount "3" (this is because there are three characters in the value "123").

The assessment program 903 compares the acquired computer identifier "Server A" with the computer identifiers 1001 in the vulnerability countermeasure log 901. In this case, there is no applicable vulnerability countermeasure log, so that the assessment program 903 goes to step 1308.

The assessment program 903 compares the acquired computer identifier "Server A" with the computer identifiers 402 in the configuration information data 208. In this case, the configuration ID's "1" and "2" correspond to the computer identifier 402 "Server A." The assessment program 903 repeats the process of steps 1309 through 1312 on each of two pieces of software "Web server program" and "Operating system A," because there are two items of configuration information.

The assessment program 903 compares the first software "Web server program" and the first version "0.9" with the software 503 and versions 504 in the vulnerability information data 209. In this case, the vulnerability ID "1" corresponds to the software 503 "Web server program" and version 504 "Before 1.0." The assessment program 903 executes the countermeasure program 212, sending the computer identifier "Server A," software "Web server program," version "0.9," parameter "id," and value "123" to the countermeasure program 212, because there exists the applicable vulnerability information.

The specific processing of the countermeasure program 212 was discussed above in conjunction with the first embodiment.

The assessment program 903 stores into the vulnerability countermeasure log 901 the computer identifier "Server A," software "Web server program," vulnerability ID "1," and countermeasure ID's "1, 2" identifying the countermeasures executed by the countermeasure program 212.

The assessment program 903 compares the second software "Operating system A" and the second version "2.3" with the software 503 and versions 504 in the vulnerability information data 209. In this case, there is no applicable vulnerability information, so that the countermeasure process (step 1310) and the process of updating the vulnerability countermeasure log 901 (step 1311) are not carried out.

Next, the assessment program 903 compares the second parameter "cmd" with the route information data 207. In this case, the route ID 301 "2" corresponds to the host 302 "www.serverA.org," path 303 "serverA.cgi," and parameter 304 "cmd." The assessment program 903 acquires the computer identifiers "Server A, server B" stored on the route 305 in the applicable route information.

It will be appreciated from the above steps that the value "update" corresponding to the parameter "cmd" is processed by "Server A" and "Server B." The process from step 1305 to step 1313 is repeated on each of the two computer identifiers "Server A" and "Server B," because there exist two servers on the route in this case.

The assessment program 903 updates the data amount corresponding to the host "www.serverA.org," path "serverA.cgi," and computer identifier "Server A" in the data reach log 902. The assessment program 903 adds the data amount "6" derived from "update" to the current amount "3," thereby storing the value "9" as the data amount, because the data amount is set with "3" in this case.

The assessment program 903 compares the acquired computer identifier "Server A" with the computer identifiers 1001 in the vulnerability countermeasure log 901. In this case, there exists the vulnerability countermeasure long stored earlier, so that the assessment program 903 proceeds to execute the countermeasure program 212 in step 1307.

The assessment program 903 updates the data reach log 902 with regard to the second computer identifier "Server B." At this point, the assessment program 903 stores the host "www.serverA.org," path "serverA.cgi," computer identifier "Server B," and data amount "6" into the data reach log 902.

The assessment program 903 compares the acquired computer identifier "Server B" with the computer identifiers 1001 in the vulnerability countermeasure log 901. In this case, there is no applicable vulnerability countermeasure log, so that the assessment program 903 goes to step 1308.

The assessment program 903 compares the acquired computer identifier "Server B" with the computer identifiers 402 in the configuration information data 208. In this case, the configuration ID's "3" and "4" correspond to the computer identifier 402 "Server B." The process from step 1309 to step 1312 is repeated on each of two pieces of software "DB server program" and "Operating system B," because there are two items of configuration information.

The assessment program 903 compares the first software "DB server program" and the first version "2.3" with the software 503 and versions 504 in the vulnerability information data 209. In this case, there is no applicable vulnerability information, so that the countermeasure process (step 1310) and the process of updating the vulnerability countermeasure log 901 (step 1311) are not carried out.

The assessment program 903 compares the second software "Operating system B" and the second version "0.5" with the software 503 and versions 504 in the vulnerability information data 209. In this case, the vulnerability ID "4" corresponds to the software 503 "Operating system B" and the version 504 "Before 1.0." The assessment program 903 executes the countermeasure program 212, sending the computer identifier "Server B," software "Operating system B," parameter "cmd," and value "update" to the countermeasure program 207, because there exists the applicable vulnerability information.

The assessment program 903 stores into the vulnerability countermeasure log 901 the computer identifier "Server B," software "Operating system B," vulnerability ID "4," and countermeasure ID "3" identifying the countermeasure executed by the countermeasure program 212.

Figure 14:
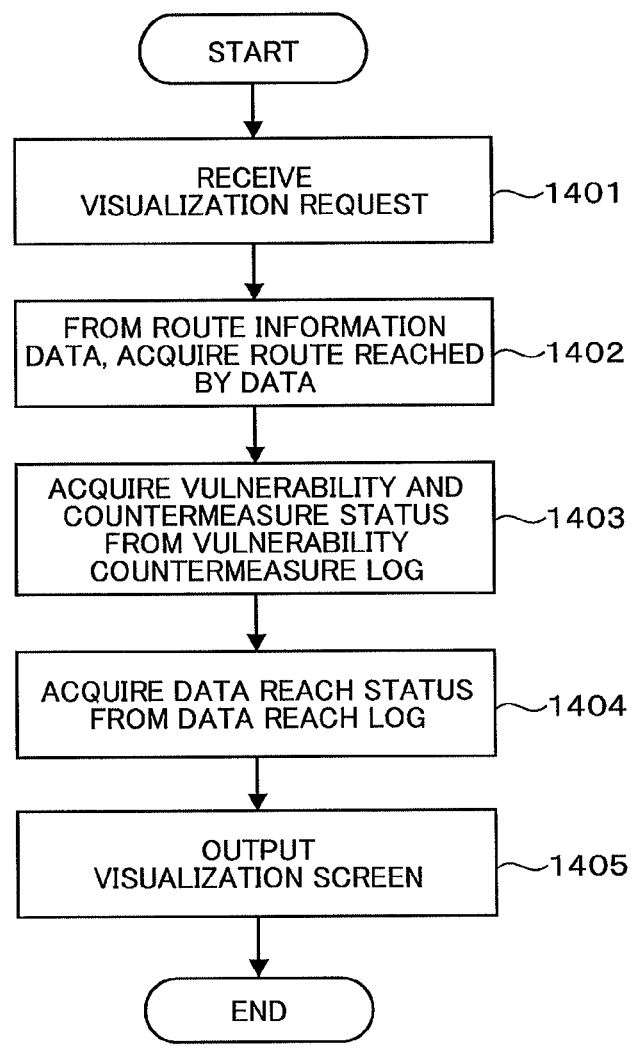
FIG. 14 is a flowchart of a visualization process of the second embodiment.

Explained next is the process by which the visualization program 904 of the vulnerability countermeasure device 101 receives a visualization request and visualizes the results of vulnerability countermeasures (the process is called the visualization process hereunder). FIG. 14 is a flowchart of the visualization process.

As shown in FIG. 14, the visualization program 904 executing the visualization process is performed by the CPU 203. The visualization program 904 receives a visualization request from the input/output device 204 (step 1401). The visualization request includes at least information about the host that performs visualization and about the path involved.

The visualization program 904 compares the received host and path with the hosts 302 and paths 303 in the route information data 207 so as to acquire the applicable route 305 (step 1402).

The visualization program 904 compares the computer identifier included in the route acquired in step 1402 with the computer identifiers 1001 in the vulnerability countermeasure log 901. If there exists the applicable computer identifier 1001, the visualization program 904 acquires the applicable software 1002, vulnerability ID 1003, and countermeasure ID 1004 (step 1403).

The visualization program 904 compares the host and path received in step 1401 and the computer identifier obtained in step 1402 with the hosts 1101, path 1102, and computer identifiers 1103 in the data reach log 902 so as to acquire the applicable data amount 1104 (step 1404).

From the information acquired in steps 1402 through 1404, the visualization program 904 draws a visualization screen and outputs the screen to the input/output device 204 (step 1405). At this point, the visualization program 904 restores and visualizes data reach status of each computer from the route information acquired in step 1402.

The flow of the visualization process from step 1401 to step 1405 is explained below using a specific example. Suppose that the visualization program 904 receives a visualization request requesting visualization of the result of the countermeasure involving the host "www.serverA.org" and path "serverA.cgi." The visualization program 904 compares the received information about the host "www.serverA.org" and path "serverA.cgi" with the hosts 302 and paths 303 in the route information data 207. In this case, what applies are three items of route information consisting of the route ID's 301 "1," "2" and "3."

The visualization program 904 acquires the computer identifiers 1001 included in the three applicable items of route information 305. In this case, the three applicable routes 305 are "Server A," "Server A, server B," and "Server A, server B, server C." Three computer identifiers "Server A," "Server B" and "Server C," with duplications excluded, are found included in these routes 305.

The visualization program 904 compares the acquired computer identifiers with the computer identifiers 1001 in the countermeasure log 901 so as to obtain the applicable software 1002, vulnerability ID 1003, and countermeasure ID 1004. In this case, the computer identifier 1001 "Server A" corresponds to the information in the first row of the countermeasure log 901 containing the software 1002 "Web server program," vulnerability ID 1003 "1," and countermeasure ID's 1004 "1, 2." Also, the computer identifier 1001 "Server C" corresponds to the information in the second row of the countermeasure log 901 containing the software 1002 "Image processing program," vulnerability ID 1003 "3," and countermeasure ID 1004 "4."

The visualization program 904 compares the information received as the visualization request regarding the host "www.serverA.org" and path "serverA.cgi" as well as the acquired information about the computer identifiers "Server A," "Server B" and "Server C" with the data reach log 902 so as to acquire the applicable data amounts. In this case, the applicable data amounts are "300," "200" and "100" for the servers A, B and C, respectively.

Using the information obtained from the above process, the visualization program 904 outputs the visualization result screen such as one shown in FIG. 12.

As described, when the visualization program 904 of the vulnerability countermeasure device for executing vulnerability countermeasures visualizes the results of the countermeasures taken against vulnerability, the service provider is able to know these results quickly.

Figure 15:
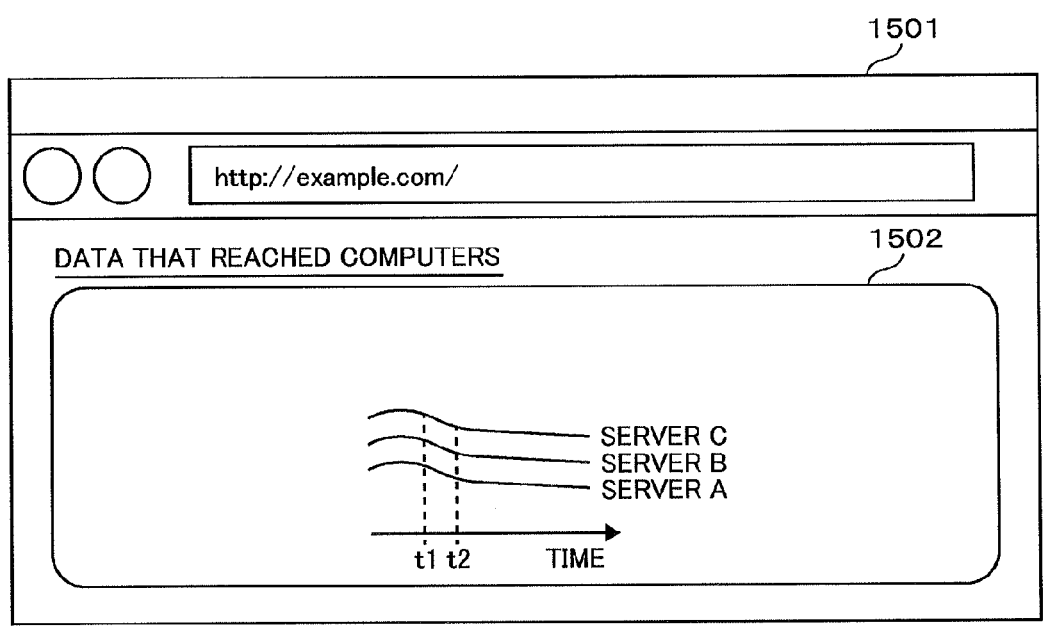
FIG. 15 is a schematic view showing a variation of the countermeasure result visualization screen of the second embodiment.

Alternatively, the second embodiment may be partially modified as follows: The information of the data reach log 902 may be stored into the storage device at intervals of a predetermined time period so as to reset the data amounts. This makes it possible to display the amounts of the data that reached the computers in chronological order, as shown in FIG. 15. The chronological display of the amounts of the data having reached the computers allows the service provider to see, for example, that the rate of change in data amount during a given time period (between t1 and t2) is different from the rates of change during other time periods. Such display permits the service provider to assess which computer developed a failure at which point in time.

As another alternative, visualization requests may be received through the interface 201 or 202 and the results of the visualization process may be transmitted therethrough. This allows the service provider in a remote environment to verify the results of vulnerability countermeasures being executed.

As a further alternative, the visualization program 904 may be separated from the vulnerability countermeasure device 101 and installed in another computer. This contributes to alleviating visualization workload of the vulnerability countermeasure device 101. Also, the vulnerability countermeasure log 901 and data reach log 902 necessary for visualization may be separated from the vulnerability countermeasure device 101 and installed in another computer.

It is to be understood that while the present invention has been described in conjunction with specific embodiments, they are not limitative of the invention. It is evident that many alternatives, modifications and variations will become apparent to those skilled in the art in light of the foregoing description and within the spirit and scope of the appended claims. Also, suitable combinations of multiple components disclosed in the above-described embodiments may lead to devising further variations of this invention. For example, some components may be deleted from all those constituting an embodiment of the invention to form a variation thereof, or some components from different embodiments may be suitably combined to make up yet another variation.

Thus the scope of the invention should be determined by the appended claims and their legal equivalents, rather than by the examples given.

What is claimed is:

1. A vulnerability countermeasure device for taking countermeasures against the vulnerability of a system configured of a plurality of computers connected via a network, the vulnerability countermeasure device comprising:

a storage unit which stores configuration information associating each of the computers with a piece of software possessed thereby, vulnerability information associating the software with information related to the vulnerability of the software, and countermeasure policy information associating the software with a countermeasure policy to be executed if there is a vulnerability in the software;

an assessment unit which receives data transmitted by a used terminal on the system, calculates the computer that the data will reach on the basis of information related to a route of the data included in the received data, acquires the software residing in the computer based on the calculated computer and on the configuration information, and assesses whether there is a vulnerability in the acquired software, and a countermeasure unit which, if the assessment unit assesses that there is a vulnerability in the software, executes countermeasures on the software assessed to be vulnerable against the vulnerability in accordance with the countermeasure policy stored in the countermeasure policy information;

wherein the assessment unit further includes a holding unit which, upon assessing that there is a vulnerability in the software of the computer, holds the computer, the software, the vulnerability information, and results of the countermeasures taken against the vulnerability, and wherein the vulnerability countermeasure device further includes a visualization unit which visualizes the computer, the software, the vulnerability information, and the results of the countermeasures taken against the vulnerability, all held in the assessment unit.

2. The vulnerability countermeasure device according to claim 1, wherein the assessment unit calculates the computer that the data will reach with regard to each of the parameters providing operating conditions for services offered by the software included in the data.

3. The vulnerability countermeasure device according to claim 1, wherein the assessment unit acquires the software residing in each of the computers.

4. The vulnerability countermeasure device according to claim 1, wherein the assessment unit assesses whether there is a vulnerability in each piece of the software.

5. The vulnerability countermeasure device according to claim 1, wherein the countermeasure unit executes the countermeasure designated in the countermeasure policy for each of the parameters providing operating conditions for services offered by the software included in the data.

6. The vulnerability countermeasure device according to claim 1, wherein the countermeasure unit executes the countermeasure designated in the countermeasure policy for each of the computers and for each piece of the software.

7. The vulnerability countermeasure device according to claim 1, wherein the visualization unit outputs simultaneously the computer that the data will reach and the vulnerability information residing in the computer.

8. The vulnerability countermeasure device according to claim 1, wherein the visualization unit outputs simultaneously the computer that the data will reach and the results of the countermeasures executed by the computer.

9. The vulnerability countermeasure device according to claim 1, wherein the visualization unit outputs simultaneously the computer that the data will reach and the amount of the data reaching the computer.

10. A vulnerability countermeasure method for use with a vulnerability countermeasure device for taking countermeasures against the vulnerability of a system configured of a plurality of computers connected via a network, the vulnerability counter method comprising:

causing the vulnerability countermeasure device to receive data transmitted by a used terminal on the system, calculate the computer that the data will reach on the basis of information related to a route of the data included in the received data, acquire the software residing in the computer based on the calculated computer and on configuration information associating each of the computers with a piece of software possessed thereby, and assess whether there is a vulnerability in the acquired software based on the acquired software and on vulnerability information associating the software with information related to the vulnerability of the software, and if the assessment involves assessing that there is a vulnerability in the software, then causing the vulnerability countermeasure device to execute countermeasures on the software assessed to be vulnerable against the vulnerability in accordance with the countermeasure policy stored in the countermeasure policy information;

wherein, upon assessing that there is a vulnerability in the software of the computer, the assessment involves holding the computer, the software, the vulnerability information, and results of the countermeasures taken against the vulnerability, and wherein the vulnerability countermeasure method further comprises visualizing the computer, the software, the vulnerability information, and the results of the countermeasures taken against the vulnerability, all held during the assessment.

11. The vulnerability countermeasure method according to claim 10, wherein the assessment involves calculating the computer that the data will reach with regard to each of the parameters providing operating conditions for services offered by the software included in the data.

12. The vulnerability countermeasure method according to claim 10, wherein the assessment involves acquiring the software residing in each of the computers.

13. The vulnerability countermeasure method according to claim 10, wherein the assessment involves assessing whether there is a vulnerability in each piece of the software.

14. The vulnerability countermeasure method according to claim 10, wherein the countermeasure execution involves executing the countermeasure designated in the countermeasure policy for each of the parameters providing operating conditions for services offered by the software included in the data.

15. The vulnerability countermeasure method according to claim 10, wherein the countermeasure execution involves executing the countermeasure designated in the countermeasure policy for each of the computers and for each piece of the software.

16. The vulnerability countermeasure method according to claim 10, wherein the visualization involves outputting simultaneously the computer that the data will reach and the vulnerability information residing in the computer.

17. The vulnerability countermeasure method according to claim 10, wherein the visualization involves outputting simultaneously the computer that the data will reach and the results of the countermeasures executed by the computer.

18. The vulnerability countermeasure device according to claim 10, wherein the visualization involves outputting simultaneously the computer that the data will reach and the amount of the data reaching the computer.

\* \* \* \* \*